US008875597B2

(12) United States Patent
Groleau et al.

(10) Patent No.: US 8,875,597 B2
(45) Date of Patent: Nov. 4, 2014

(54) STEERING WHEEL

(75) Inventors: Laurent Groleau, Quincay (FR); Olivier Bertrand, Courcôme (FR)

(73) Assignee: Autoliv Development AB, Vargarda (SE)

( * ) Notice: Subject to any disclaimer, the term of this patent is extended or adjusted under 35 U.S.C. 154(b) by 39 days.

(21) Appl. No.: 13/375,387

(22) PCT Filed: May 17, 2010

(86) PCT No.: PCT/GB2010/000983
§ 371 (c)(1),
(2), (4) Date: Nov. 30, 2011

(87) PCT Pub. No.: WO2010/139927
PCT Pub. Date: Dec. 9, 2010

(65) Prior Publication Data
US 2012/0073401 A1  Mar. 29, 2012

(30) Foreign Application Priority Data
Jun. 1, 2009  (EP) ..................................... 09251460

(51) Int. Cl.
B62D 1/04 (2006.01)
B62D 1/06 (2006.01)

(52) U.S. Cl.
CPC ...................................... *B62D 1/06* (2013.01)
USPC ........................................................ 74/552

(58) Field of Classification Search
USPC ........................................ 74/552–558, 558.5
See application file for complete search history.

(56) References Cited

U.S. PATENT DOCUMENTS

| 3,576,139 | A | * | 4/1971 | Conterno | 74/552 |
| 3,802,291 | A | * | 4/1974 | Young et al. | 74/552 |
| 5,236,764 | A | * | 8/1993 | Lenz et al. | 428/158 |
| 2003/0075003 | A1 | | 4/2003 | Tanabe et al. | |
| 2003/0192396 | A1 | | 10/2003 | Lorenz | |
| 2004/0050204 | A1 | | 3/2004 | Albayrak et al. | |
| 2008/0110292 | A1 | | 5/2008 | Ohira et al. | |
| 2008/0250643 | A1 | | 10/2008 | Kwon et al. | |
| 2009/0045541 | A1 | * | 2/2009 | Lazano et al. | 264/129 |

FOREIGN PATENT DOCUMENTS

JP   2000085586 A  *  3/2000  ............... B62D 1/06

OTHER PUBLICATIONS

Translation of JP 2000-85586, obtained Jul. 10, 2013.*
International Search Report and Written Opinion of ISA for PCT/GB2010/000983, ISA/EP, Rijswijk, NL mailed Aug. 20, 2010.

* cited by examiner

*Primary Examiner* — Alan B Waits
*Assistant Examiner* — Brian McGovern
(74) *Attorney, Agent, or Firm* — Harness, Dickey & Pierce, P.L.C.

(57) ABSTRACT

A steering wheel has a rim with an armature substantially encapsulated by foam. The foam includes a major foam member and a separate minor foam member. The major foam member has a cross-sectional profile effective to cover a major cross-sectional extent of the armature and define a gap in the foam member adjacent the armature. The gap has a maximum cross-sectional width which is equal to or less than the cross-sectional width of the armature, and is substantially filled by said minor foam member.

23 Claims, 6 Drawing Sheets

STEERING WHEEL

CROSS-REFERENCE TO RELATED APPLICATIONS

This application is a 371 U.S. National Stage of International Application No. PCT/GB2010/000983, filed May 17, 2010. This application claims the benefit of European Patent Application No. 09251460.3, filed Jun. 1, 2009. The disclosures of the above applications are incorporated herein by reference.

FIELD

The present invention relates to a steering wheel for a motor vehicle.

BACKGROUND

Conventional steering wheels suitable for use in motor vehicles typically comprise a metal frame having a central boss from which one or more spokes extend in a generally radial direction. The generally circular or near-circular metal armature is supported by the radially outer most ends of the spokes in order to define part of a peripheral rim of the steering wheel. The armature is typically covered by a foam covering which may be applied in two discrete parts. For example, it has been proposed previously to provide the foam covering in the form of two segments of synthetic foam, one of which is connected to the armature of the rim from the front side of the steering wheel and the other of which is connected to the armature from the rear side of the steering wheel, the two foam segments engaging one another on either side of the armature. However, many of the previously proposed steering wheels of this general type suffer problems arising from relative rotational movement between the two foam segments arising from general use of the steering wheel. Also, previously proposed foam arrangements can result in unsightly joins between the two foam segments on the inner and outer surfaces of the rim.

SUMMARY

The present invention seeks to provide an improved steering wheel.

According to a first aspect of the present invention, there is provided a steering wheel having a rim comprising an armature substantially encapsulated by a foam covering, the foam covering comprising a major foam member and a separate minor foam member, the major foam member having a profile in radial cross-section effective to cover a major extent of the armature and define a gap in the foam member adjacent the armature, the gap having a maximum cross-sectional width not exceeding the cross-sectional width of the armature and being substantially filled by said minor foam member.

Preferably, each said foam member is resiliently deformable, and said minor foam member is compressed within said gap.

Conveniently, said gap extends substantially all the way around the rim, and is located on the rear side of said armature.

Advantageously, said gap in the major foam member is defined by a pair of spaced apart surfaces in facing relation to one another.

Optionally, said surfaces are substantially parallel with one another in radial cross-section.

Alternatively, said surfaces may be convergent in radial cross-section such that said gap narrows with increasing radial distance from said armature.

Conveniently, each said surface is substantially aligned in radial cross-section with a respective one of a pair of convergent external surfaces of the armature.

Preferably, said armature is a metal casting and the convergence of said external surfaces corresponds to the draft of the casting.

Advantageously, said minor foam member has a pair of oppositely facing surfaces, each of which engages a respective said surface of the major member.

Conveniently, said armature has a profile in radial cross-section defining a re-entrant recess which is at least partially filled by part of one of said foam members.

Optionally, the major foam member has a generally C-shaped profile defining a pair of spaced apart arms in radial cross-section, the armature being received between said arms such that the ends of said arms extend beyond said armature and define said gap therebetween, said minor foam member at least partially filling said recess in the armature and filling said gap in the major foam member.

Alternatively, the major foam member may have a generally E-shaped profile in radial cross-section defining a central arm spaced between a pair of side arms, the central arm being received within said recess in the armature such that the ends of said side arms extend beyond said armature and define said gap therebetween.

Preferably, at least one of said foam members is made of expanded polypropylene. However, it is to be appreciated that other types of foam material could be used instead, such as, for example, expanded polystyrene or expanded polyethylene.

Conveniently, the steering wheel further comprises an outer skin provided over the foam covering.

According to another aspect of the present invention, there is provided a kit of parts for a steering wheel according to the first aspect, the kit comprising: a steering wheel frame having a rim comprising said armature; said major foam member; and said minor foam member. The kit may also include said leather or leatherette outer skin.

BRIEF DESCRIPTION OF THE DRAWINGS

So that the invention may be more readily understood, and so that further features thereof may be appreciated, embodiments of the invention will now be described by way of example with reference to the accompanying drawings in which.

DETAILED DESCRIPTION

Figure 1:
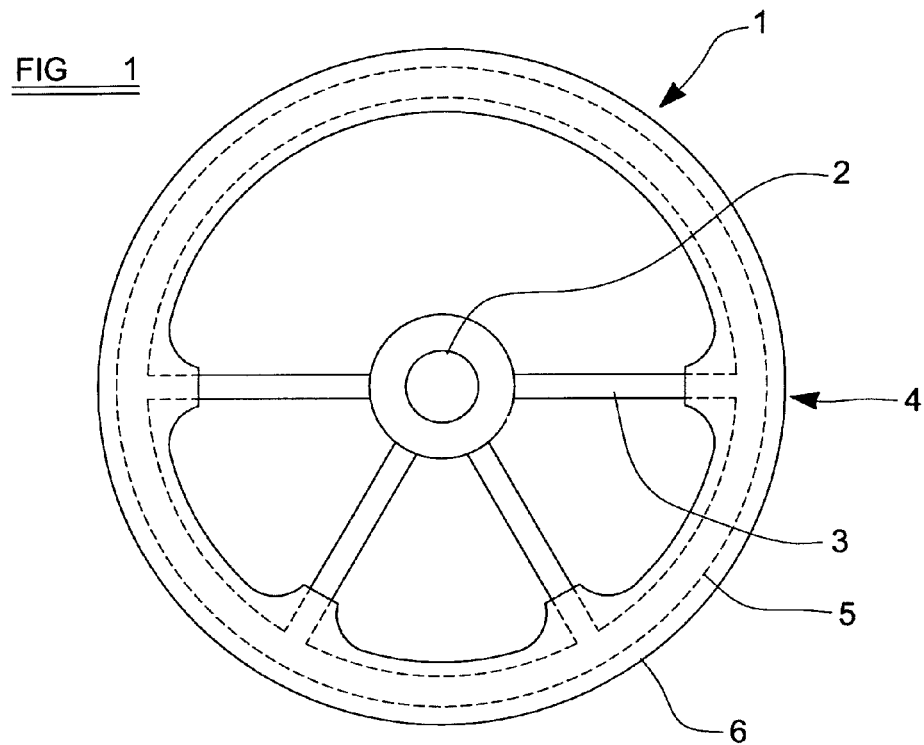
FIG. 1 is a schematic illustration of a steering wheel in accordance with the invention.

Referring initially to FIG. 1 of the drawings, there is illustrated a steering wheel 1 comprising a central hub 2 from which a plurality of spokes 3 extend substantially radially, the spokes supporting an outer rim 4. More particularly, it is to be noted that the radially outermost ends of the spokes 3 support a generally circular or approximately circular metal armature 5 (illustrated in dashed lines in FIG. 1). Together, the hub 2, spokes 3, and armature 5 of the steering wheel can be considered to form an integral frame. The armature 5, and optionally at least a region of the spokes 3, may be provided with a foam covering 6. In the arrangement illustrated in FIG. 1, the foam covering 6 serves to completely encapsulate the underlying armature 5 whilst also covering the radially outermost region of each spoke 3. As thus far described, the steering wheel 1 is generally conventional.

Figure 2:
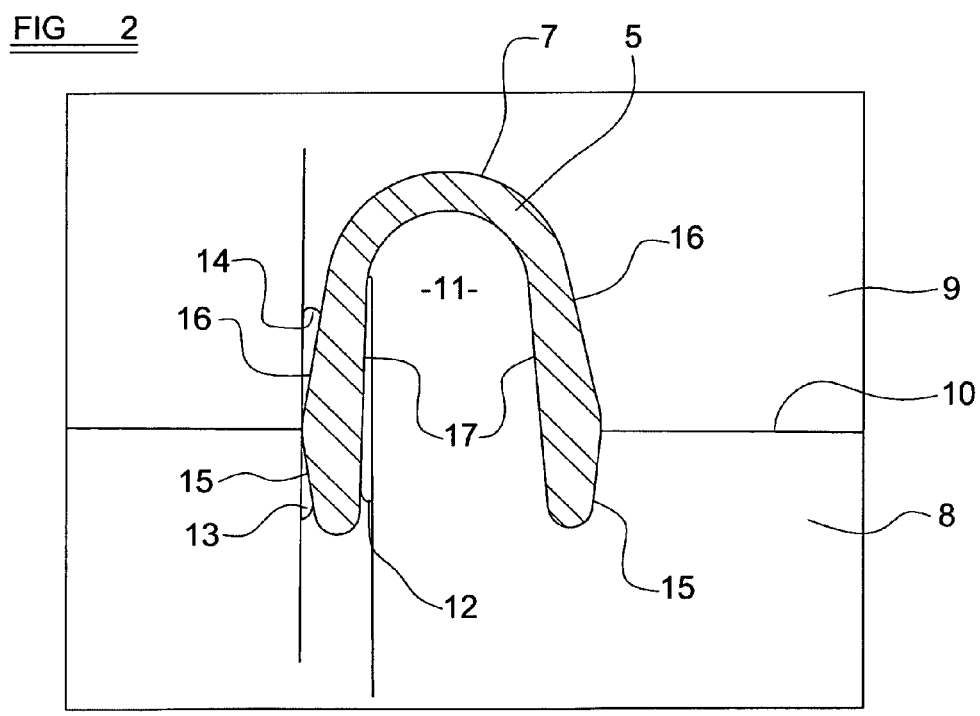
FIG. 2 is a schematic illustration showing the manner in which part of the rim of the steering wheel is cast.

FIG. 2 shows the profile of the metal armature 5 as viewed in radial cross-section through the rim of the steering wheel. The armature 5 is preferably cast from metal material such as aluminium, magnesium or a metal alloy comprising both aluminium and magnesium. Accordingly, FIG. 2 shows the armature 5 being cast within a mould cavity 7 formed between a first mould part 8 and a second mould part 9. The two mould parts 8, 9 are separable along a split-line 10. As will be noted, the armature 5 is cast so as to have a generally n-shaped profile in radial cross-section, thus defining a re-entrant recess 11.

In order to ensure that the casting may be removed from the two mould parts 8, 9 when they are separated along the split-line 10, the mould cavity 7 is formed so as to have appropriate draft angles 12, 13, 14 with reference to lines normal to the split-line 10. Accordingly, when viewed in the orientation illustrated in FIG. 2, the armature 5 is thus formed with a first pair of radially converging external surfaces 15, a second pair of radially converging external surfaces 16, and a pair of radially converging inner surfaces 17.

Figure 3:
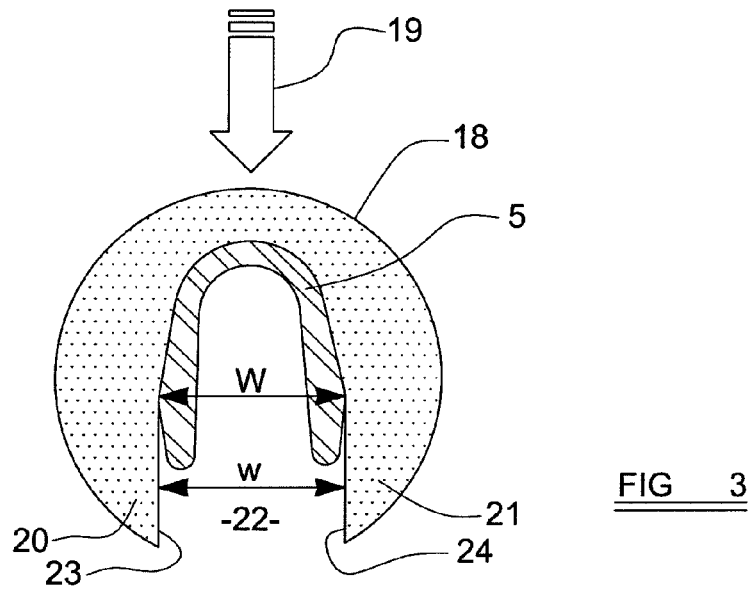
FIG. 3 is a radial cross-sectional view taken through the part of the rim illustrated in FIG. 2, to which is mounted a first foam member.

Turning now to consider FIG. 3, the armature 5 is shown having been removed from the mould cavity 7. A resiliently deformable foam member 18 is shown having been connected to the armature 5 via movement along a direction indicated generally by arrow 19. The foam member 18 may be formed from any convenient foam material such as, for example, expanded polystyrene or expanded polyethylene. However, the foam member 18 is preferably formed from expanded polypropylene.

As will be appreciated from FIG. 3, the foam member 18 has a generally C-shaped profile in radial cross-section and thus defines a pair of spaced apart arms 20, 21. In order to mount the foam member 18 on the armature 5, the foam member 18 is moved towards the armature 5, along the direction indicated by arrow 19, from the front of the armature such that the armature 5 is received between the spaced apart arms 20, 21 as illustrated. When the foam member 18 is properly mounted on the armature 5 as illustrated, the spaced apart arms 20, 21 extend beyond the armature 5 so as to define a gap 22 in the foam member and which is located generally adjacent the armature 5. As will be noted, the particular embodiment illustrated in FIG. 3 is configured such that the gap 22 is defined between a pair of spaced apart surfaces 23, 24, each of which is associated with a respective arm 20, 21. The surfaces 23, 24 are arranged so as to lie in facing relation to one another across the gap 22 and lie substantially parallel with one another when viewed in radial cross-section as illustrated in FIG. 3.

The foam member 18 is configured such that when mounted on the armature 5 as illustrated in FIG. 3, the gap 22 defined between the facing surfaces 23, 24 has a maximum cross-sectional width w which is substantially equal to the cross-sectional width W of the armature 5. However, as will be explained in more detail below; in other embodiments of the invention, the maximum cross-sectional width w of the gap 22 may be less than the cross-sectional width W of the armature 5.

Figure 4:
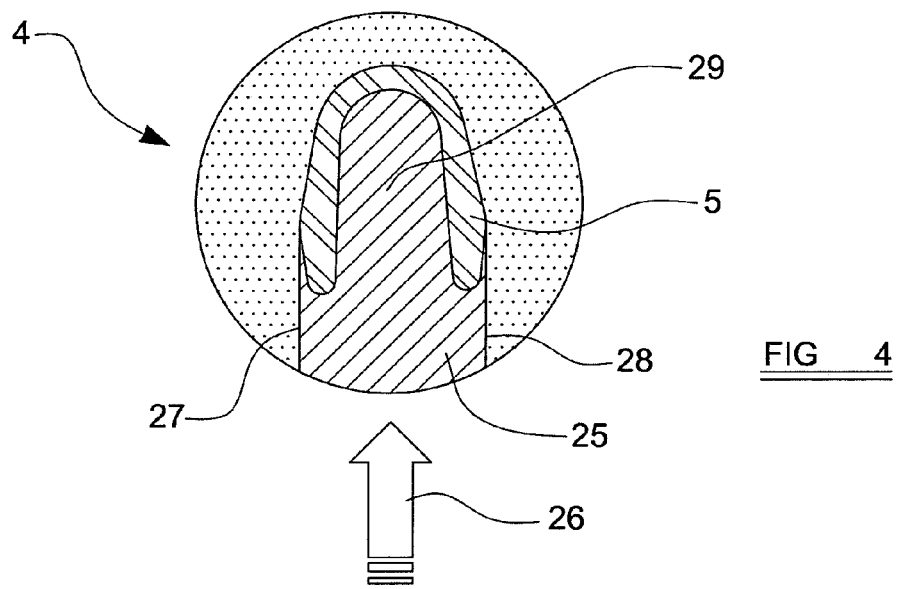
FIG. 4 is a view generally corresponding to that of FIG. 3, additionally showing a second foam member.

Turning now to consider FIG. 4, a second, smaller, foam member 25 is illustrated having been inserted into the gap 22 defined between the facing surfaces 23, 24 of the first, relatively large, foam member 18. The second foam member 25 is inserted into the gap 22 by being offered up to the rear side of the armature 5 and advanced towards the armature 5 in the general direction illustrated by arrow 26. The second foam member 25 may be formed from any convenient foam material such as, for example, expanded polystyrene or expanded polyethylene. However, it is considered preferable for the second foam member 25 to be formed from expanded polypropylene. In any event, it is to be noted that the second foam member 25 is resiliently deformable and is configured such that when it is fully inserted and received within the gap 22 as illustrated in FIG. 4, the second foam member 25 is compressed slightly so as to create a secure fit within the gap 22.

As will be noted, the second foam member 25 is configured so as to have a pair of oppositely facing surfaces 27, 28, each of which is configured to engage and bear against a respective corresponding facing surface 23, 24 of the first foam member 18. Furthermore, it will also be noted from FIG. 4 that the second foam member 25 has a region indicated generally at 29 which is shaped and configured so as to substantially fill the re-entrant recess 11 formed in the armature 5.

As will thus be appreciated, the outer rim 4 of the steering wheel illustrated in FIG. 4 comprises the central armature 5 which is substantially encapsulated by a foam covering comprising the first foam member 18 and the separate second foam member 25. Because the second foam member 25 has a maximum cross-sectional width w which does not exceed the cross-sectional width W of the armature 5, it will not be visible from the front of the steering wheel in the direction indicated schematically by arrow 19 in FIG. 3. Also, because the larger first foam member 18 covers the major extent of the armature 5, with the smaller second foam member 25 effectively simply filling the gap 22, it has been found that the arrangement benefits from increased resistance to relative movement between the two foam members arising during normal operation of the steering wheel.

Figure 5:
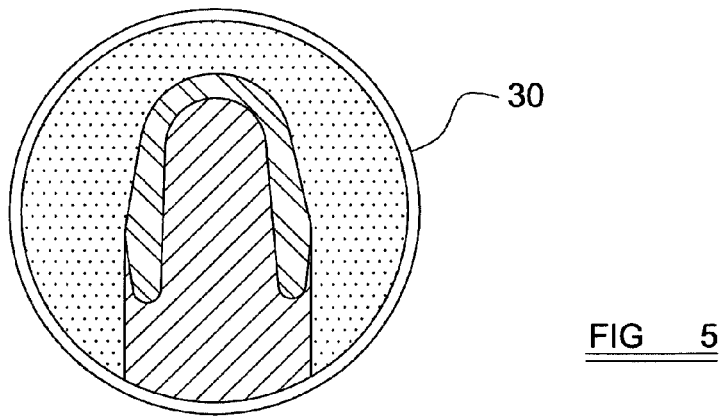
FIG. 5 is a radial cross-sectional view taken through the completed rim of the steering wheel.

Nevertheless, in order to provide a more visually and tactually pleasing steering wheel, it is proposed to supplement the foam covering provided by the two foam members 18, 25 with a thin skin 30 extending around the foam covering in the manner illustrated in FIG. 5. The skin 30 may be formed in any one of a number of different ways. For example, it is envisaged that in some embodiments of the invention, the skin 30 will be provided as a moulding of polyurethane or any convenient thermoplastic material. Alternatively, however, the skin 30 may be provided in the form of a layer of leather or leatherette material which is wrapped around the outside of the foam covering. In either case, it is envisaged that the skin 30 will have a radial thickness in the region of between 1 to 1.5 millimeters.

Figure 6:
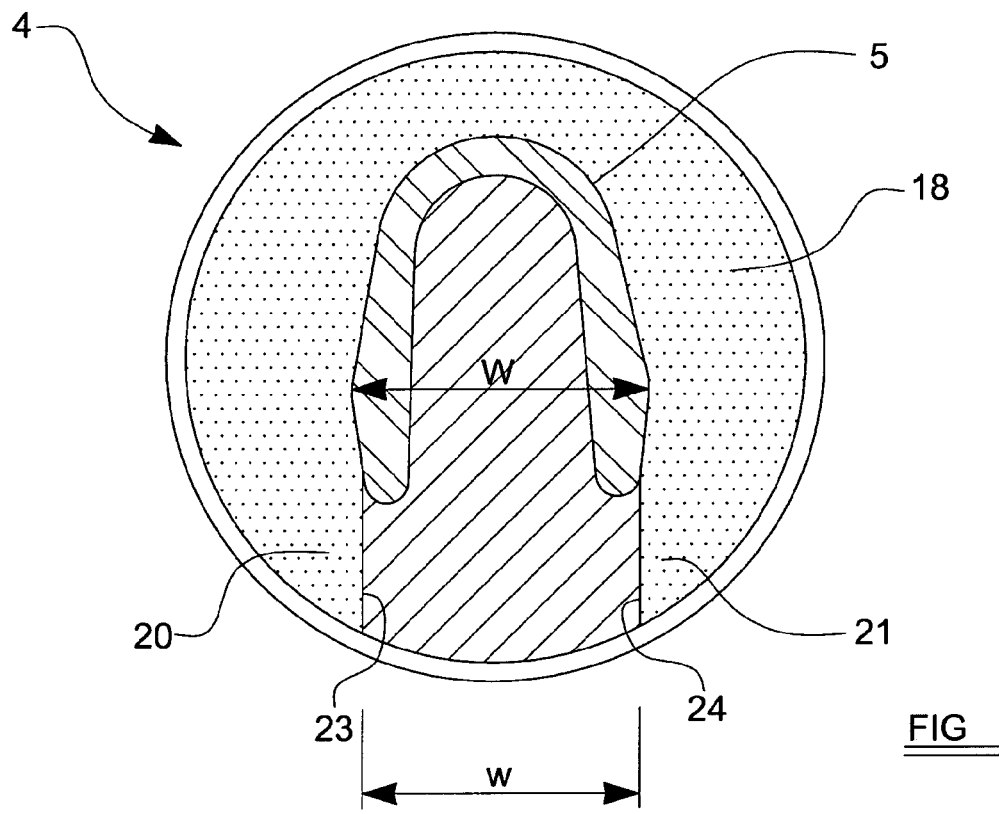
FIG. 6 is a view generally corresponding to that of FIG. 5, but illustrating rim configuration of a second embodiment.

Turning now to consider FIG. 6, there is illustrated in radial cross-section the rim 4 of an alternative embodiment of the steering wheel, in which the gap defined between the two spaced apart arms 21, 22 of the first foam member 18 is somewhat narrower than in the embodiment illustrated in FIGS. 3 to 5. In the particular embodiment illustrated in FIG. 6, it will thus be noted that the gap 22 defined by the facing surfaces 23, 24 of the first foam member 18 has a width w which is less than the cross-sectional width W of the armature 5. However, in other respects, the arrangement illustrated in FIG. 6 is largely identical to that illustrated in FIGS. 3 to 5.

Figure 7:
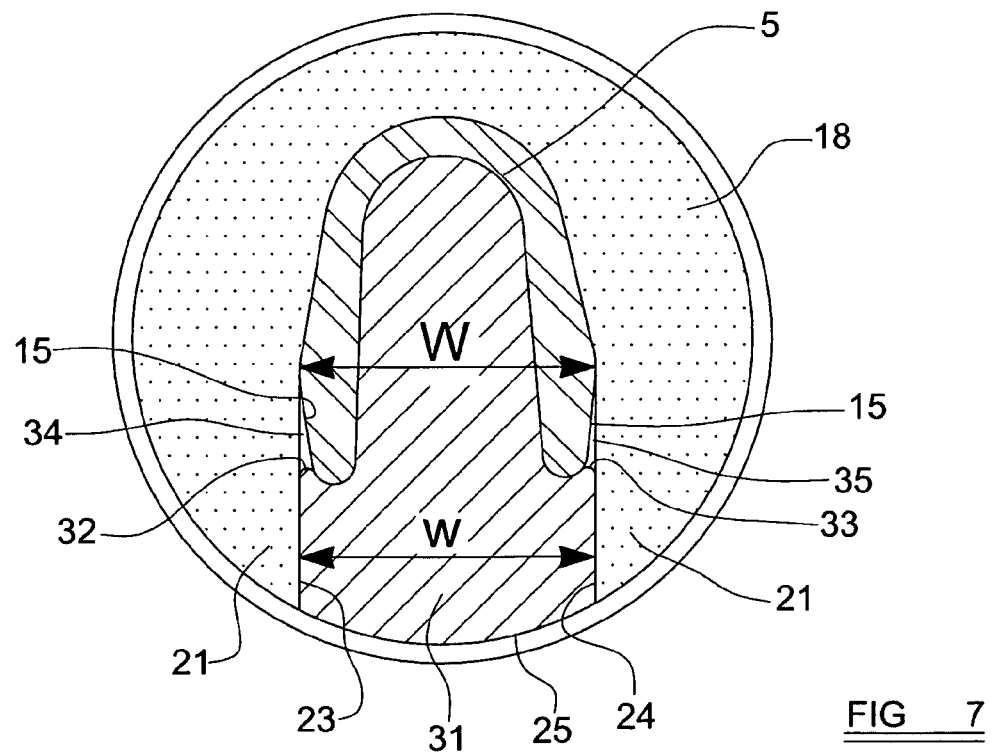
FIG. 7 is an enlarged radial cross-sectional view through the rim of a third embodiment.

FIG. 7 illustrates another embodiment of the present invention, which effectively represents and alternative variation of the arrangement shown in FIGS. 3 to 5. In this arrangement, it will be noted that the gap 22 defined between the facing surfaces 23, 24 of the major foam member 18 again has a width w which is substantially equal to the maximum cross-sectional width W of the armature 5. However, it will be noted that in this arrangement, the outer region 31 of the second foam member 25 which effectively plugs the gap 22 has a pair of radiused corners 32, 33 which lie between the armature 5 and the facing surfaces 23, 24. It will thus be noted that in this arrangement, the foam material of the second foam member 25 does not fill the narrow gaps 34, 35 formed between the surfaces 23, 24 of the major foam member 18 and the first pair of radially converging external surfaces 15 of the armature 5. In other respects the arrangements illustrated in FIG. 7 is generally identical to that illustrated in FIGS. 3-5.

Figure 8:
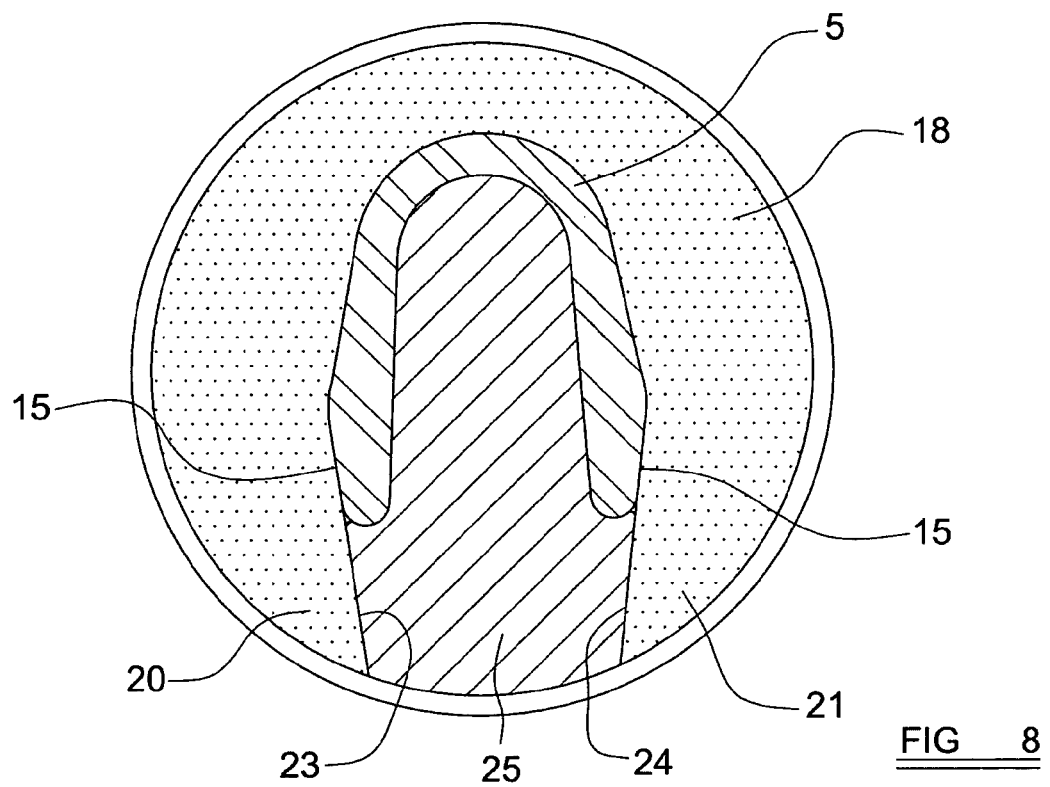
FIG. 8 is an enlarged radial cross-sectional view through the rim of a fourth embodiment.

FIG. 8 illustrates a further embodiment of the present invention. In this arrangement the major foam member 18 is configured such that the facing surfaces 23, 24 are convergent in radial cross-section such that the gap 22 defined between the surfaces narrows with increasing radial distance from the armature 5. Furthermore, it will be noted from FIG. 8 that in the particular arrangement illustrated, each of the convergent surfaces 23, 24 is aligned with a respective external surface 15 arising from the draft angle 13 of the metal casting. This arrangement necessitates a corresponding modification to the configuration of the minor foam member 25, such that its corresponding oppositely facing surfaces 27, 28 also converge in a similar sense so as to properly engage and bear against the converging surfaces 23, 24 of the major foam member 18.

The arrangement described above and illustrated in FIG. 8 has been found to be particularly advantageous because the converging nature of the gap 22 formed between the surfaces 23, 24 of the major foam member 18 serves to retain the minor foam member 25 more securely within the gap 22 and hence also within the re-entrant recess 11 of the armature 5.

Figure 9:
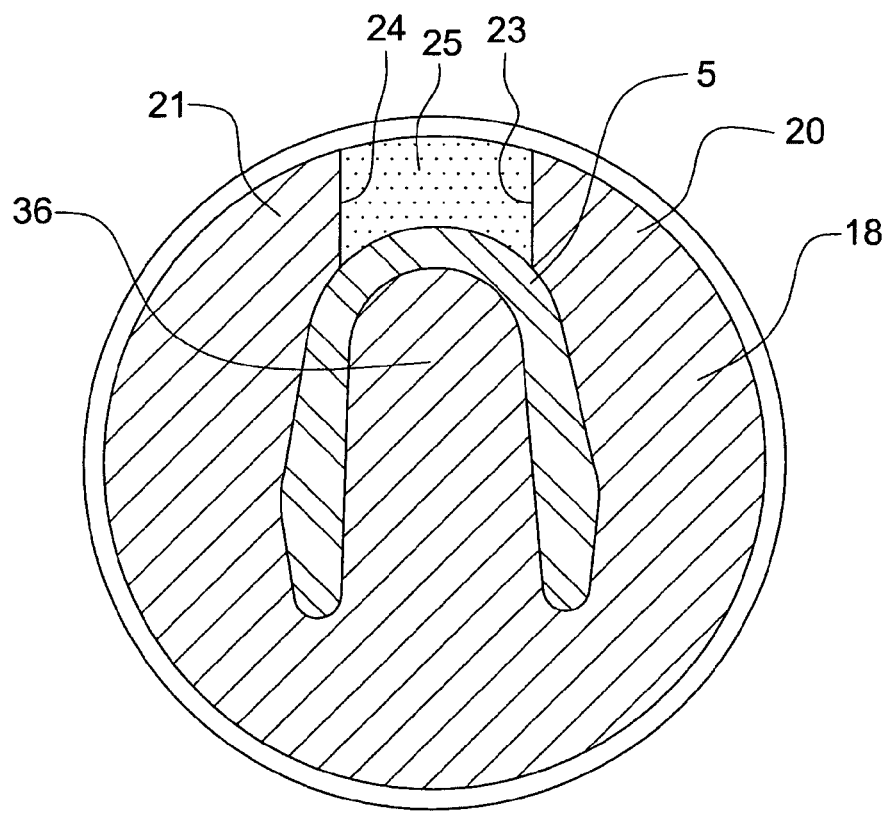
FIG. 9 is a radial cross-sectional view through the rim of a fifth embodiment.

FIG. 9 illustrates another alternative embodiment of the present invention in which the major foam member 18 which covers the major extent of the armature 5 is configured so as to have a generally E-shaped profile in radial cross-section and thus defines a central arm 36 spaced between its side arms 20, 21. In this arrangement, the major foam member 18 is mounted to the armature 5 from the opposite direction such that the central arm 36 is received within the re-entrant recess 11 of the armature and hence substantially fills the re-entrant recess. However, it is to be noted that the radially outermost ends of the two spaced apart side arms 20, 21 still extend beyond the armature 5 so as to define a gap therebetween in an otherwise similar manner to that described above.

In the arrangement of FIG. 9, the gap 22 formed in the major foam member 18, at a position generally adjacent to the armature 5, is defined between a pair of substantially parallel facing surfaces 23, 24 provided on respective side arms 20, 21. The gap 22 is again filled by a minor foam member 25 but it will be noticed that in this arrangement, the minor foam member 25 is significantly smaller than in the previously described embodiments.

Figure 10:
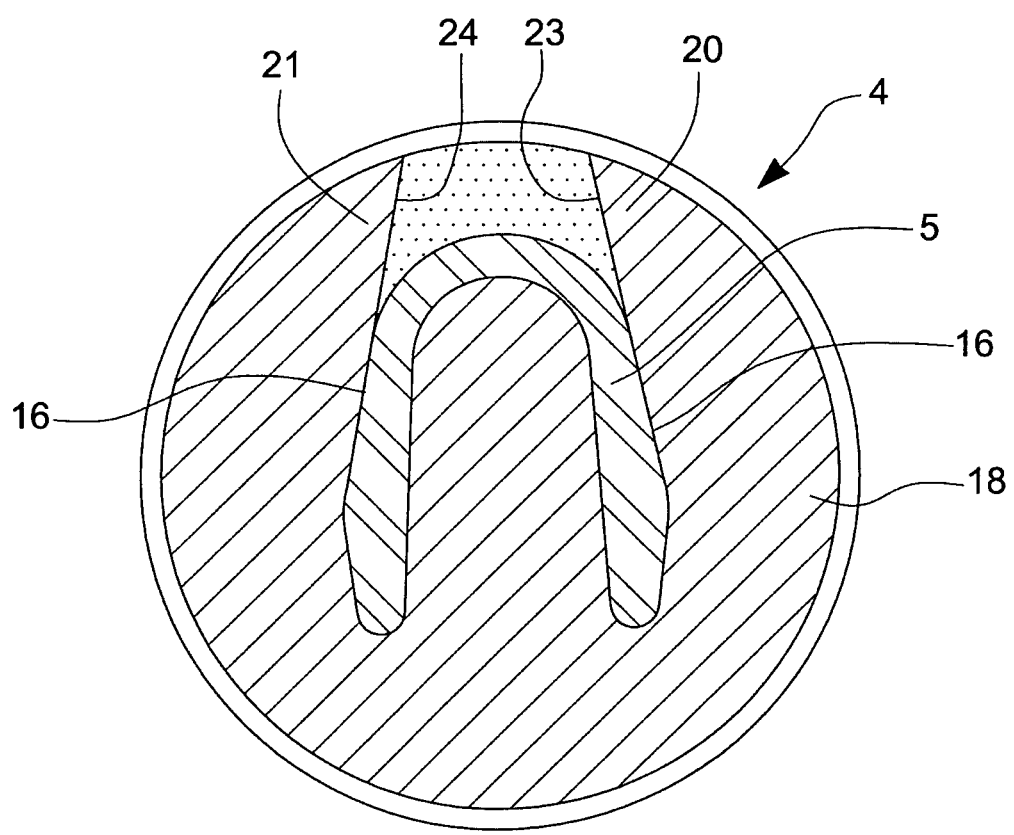
FIG. 10 is a radial cross-sectional view through the rim of a sixth embodiment.

FIG. 10 illustrates another alternative embodiment of the present invention, showing a rim construction which represents a variation of that illustrated in FIG. 9. Accordingly, it will be noted that the major foam member 18 again has a generally E-shaped profile in radial cross-section as in the case of the arrangement illustrated in FIG. 9. However, in the arrangement of FIG. 10, the facing surfaces 23, 24 of the side arms 20, 21 are convergent in radial cross-section such that the gap 22 defined between the surfaces narrows with increasing radial distance from the armature 5. Furthermore, it will be noted that the facing surfaces 23, 24 are each aligned in radial cross-section with a respective one of the second pair of radially converging external surfaces 16 of the armature 5, arising from the draft angle 14.

Figure 11:
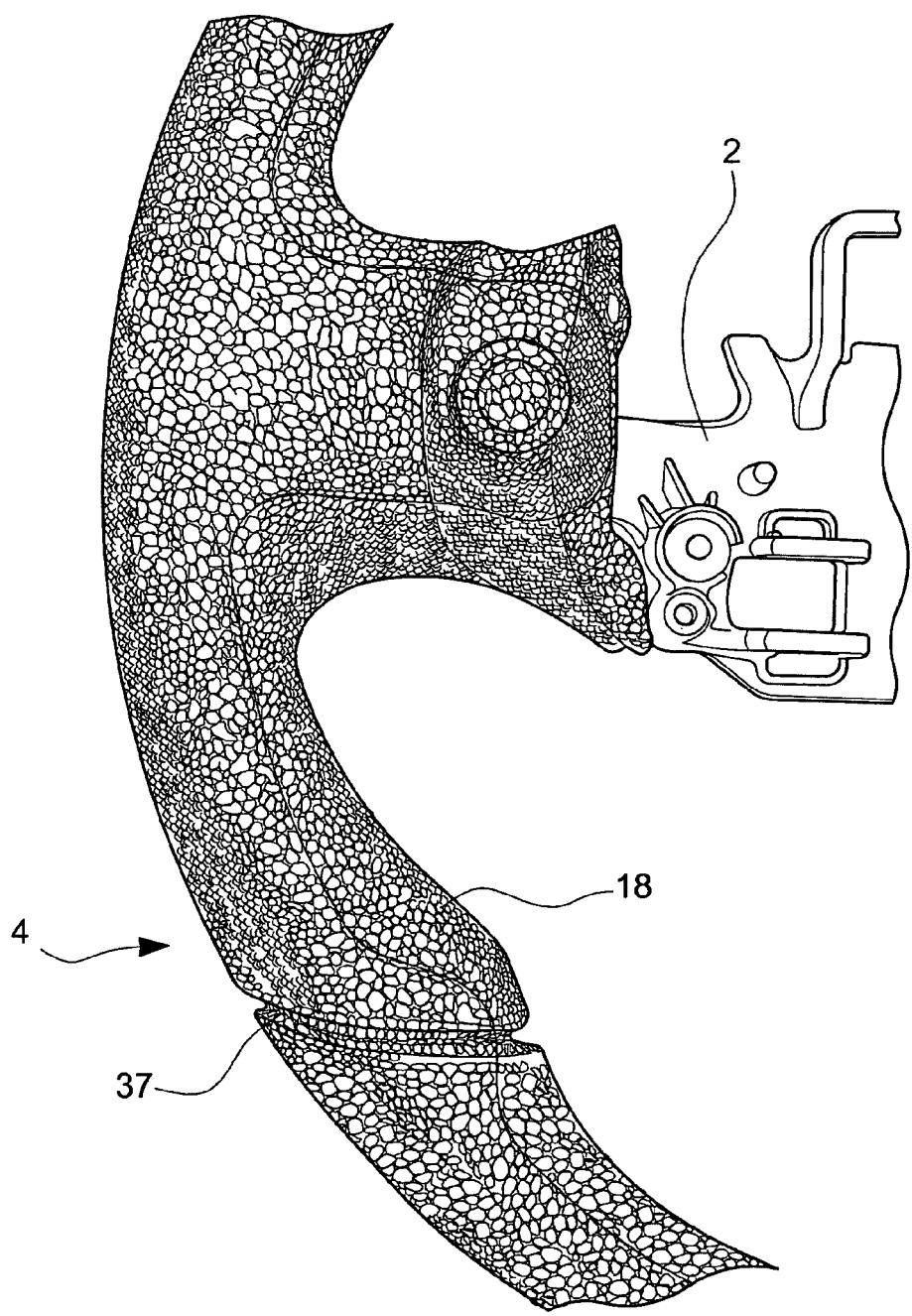
FIG. 11 is a close-up view showing the structure of part of the rim.

In each of the above-described embodiments it is considered preferable to produce the major and minor foam members 18, 25 from expanded polypropylene material using a vapour phase moulding technique. Accordingly, it is proposed to mould the foam members by filling a mould with pre-expanded spherical grains of polypropylene material and subsequently to add water vapour to the mould so as to further expand the spherical grains which will thus become compacted inside the mould. FIG. 11 illustrates the external surface of a major foam member 18 moulded using such a technique. As can be seen, the outer surface of the foam moulding is textured, the texture arising from the manner in which the polypropylene grains are expanded during the moulding process. The textured outer surface thus provides for a relatively high level of mechanical grip between the foam member and the overlying skin 30 (not shown in FIG. 11).

FIG. 11 also illustrates the provision of a groove 37 formed around the foam covering of the rim 4 and which is arranged so as to extend generally radially across. The provision of a groove 37 in this manner can be used to receive the enlarged region of a line of stitching used to form part of the outer skin 30 in the event that the skin is provided in the form of a leather or leatherette wrapping. However, even in the event that the outer skin 30 is provided in the form of an over-moulding, the provision of grooves 37 in this matter can improve the resistance of the rim structure to twisting actions arising during use of the steering wheel.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A steering wheel having:
   a rim with an armature substantially encapsulated by a foam covering,
   the foam covering including a major foam member and a separate minor foam member contacting the major foam member,
   the major foam member having a profile in radial cross-section effective to cover the armature, the profile including a gap in the major foam member adjacent the armature, the gap having a maximum cross-sectional width not exceeding a cross-sectional width of the armature and being substantially filled by said minor foam member, the gap radially extending to an outer circumferential surface of the major foam member and at least partially disposed between the armature and the outer circumferential surface, the gap defined by a continuous inner circumferential wall having a pair of spaced apart surfaces in facing relation to one another, the pair of spaced apart surfaces connected by an inner curved surface of the major foam member, an entirety of the inner curved surface directly contacting the armature, the pair of spaced apart surfaces extend beyond said armature and define said gap therebetween.

2. The steering wheel according to claim 1, wherein each of said major foam member and said minor foam member is resiliently deformable, and said minor foam member is compressed within said gap.

3. The steering wheel according to claim 1, wherein said gap extends substantially around a circumference of the rim, and is located on a rear side of said armature.

4. The steering wheel according to claim 1, wherein said pair of spaced apart surfaces are substantially parallel with one another in radial cross-section.

5. The steering wheel according to claim 1, wherein said pair of spaced apart surfaces are convergent in radial cross-section such that said gap narrows with increasing radial distance from said armature.

6. The steering wheel according to claim 5, wherein each spaced apart surface is substantially aligned in radial cross-section with a respective one of a pair of convergent external surfaces of the armature.

7. The steering wheel according to claim 6, wherein said armature is a metal casting and the convergence of said external surfaces corresponds to the draft of the casting.

8. The steering wheel according to claim 1, wherein said minor foam member has a pair of oppositely facing surfaces, each oppositely facing surface engages a respective one of the spaced apart surfaces of the major foam member.

9. The steering wheel according to claim 1, wherein said armature has a profile in radial cross-section defining a re-entrant recess which is at least partially filled by part of one of said major foam member and said minor foam member.

10. The steering wheel according to claim 9, wherein the major foam member has a generally C-shaped profile defining a pair of spaced apart arms in radial cross-section, the armature being received between said arms such that the ends of said pair of spaced apart arms extend beyond said armature and define said gap therebetween, said minor foam member at least partially filling said recess in the armature and filling said gap in the major foam member.

11. The steering wheel according to claim 9, wherein the major foam member has a generally E-shaped profile in radial cross-section defining a central arm spaced between a pair of side arms, the central arm being received within said recess in the armature such that the ends of said side arms extend beyond said armature and define said gap therebetween.

12. The steering wheel according to claim 1, wherein at least one of said major foam member and said minor foam member is made of expanded polypropylene.

13. The steering wheel according to claim 1, further comprising an outer skin covering the major foam member and the minor foam member.

14. The steering wheel according to claim 1, wherein the armature defines a re-entrant recess and further wherein the minor foam member extends into the re-entrant recess.

15. The steering wheel according to claim 14, wherein the re-entrant recess has a first width in radial cross section and the minor foam member has a second width parallel to the first width and between the armature and the outer circumferential surface of the major foam member, the second width being greater than the first width.

16. The steering wheel according to claim 1, wherein the major foam member directly contacts a majority of an outer periphery of the armature, the outer periphery extending convexly and continuously from a first arm of the armature to a second arm of the armature.

17. A kit of parts for a steering wheel comprising:
   a steering wheel frame having a rim with an armature,
   a one-piece major foam member, and
   a minor foam member contacting the major foam member,
   the major foam member having a profile in radial cross-section effective to cover the armature and having a gap adjacent the armature, the gap having a maximum cross-sectional width not exceeding the cross-sectional width of the armature and being substantially filled by said minor foam member, the gap extending radially outward from an outer surface of the armature to an outer circumferential surface of the major foam member, the gap defined by a continuous inner circumferential wall having a pair of spaced apart surfaces in facing relation to one another, the pair of spaced apart surfaces connected by an inner curved surface of the major foam member, an entirety of the inner curved surface directly contacting the armature, the pair of spaced apart surfaces extend beyond said armature and define said gap therebetween.

18. The kit of parts according to claim 17, wherein the armature defines a re-entrant recess and further wherein the minor foam member extends into the re-entrant recess.

19. The kit of parts according to claim 18, wherein the re-entrant recess has a first width in radial cross section and the minor foam member has a second width parallel to the first width and between the armature and the outer circumferential surface of the major foam member, the second width being greater than the first width.

20. The kit of parts according to claim 17, wherein the major foam member directly contacts a majority of an outer periphery of the armature, the outer periphery extending convexly and continuously from a first arm of the armature to a second arm of the armature.

21. A steering wheel comprising: a rim with an armature substantially encapsulated by a foam covering, the foam covering including:
   a minor foam member,
   a separate, one-piece major foam member contacting the minor foam member, the major foam member having a profile in radial cross-section effective to cover and directly contact a majority of a radially outer periphery of the armature and having a gap adjacent the armature, the radially outer periphery extending convexly and continuously from a first arm of the armature to a second arm of the armature, the gap having a maximum cross-sectional width not exceeding a cross-sectional width of the armature and being substantially filled by the minor foam member, the gap radially extending to an outer circumferential surface of the major foam member, wherein said armature has a profile in radial cross-section defining a re-entrant recess which is at least partially filled by part of one of said major foam member and said minor foam member, wherein the major foam member has a generally C-shaped profile defining a pair of spaced apart arms in radial cross-section, the armature being received between said arms such that the ends of said pair of spaced apart arms extend beyond said armature such that the entire armature is disposed within the major foam member and said pair of spaced apart arms define said gap therebetween, said minor foam member at least partially filling said recess in the armature and filling said gap in the major foam member, the gap defined by a continuous inner circumferential wall having a pair of spaced apart surfaces in facing relation to one another, the pair of spaced apart surfaces connected by an inner curved surface of the major foam member, an entirety of the inner curved surface directly contacting the armature.

22. The steering wheel according to claim 21, wherein the re-entrant recess has a first width in radial cross section and the minor foam member has a second width parallel to the first width and between the armature and the outer circumferential surface of the major foam member, the second width being greater than the first width.

23. The steering wheel according to claim 21, further comprising an outer skin covering the major foam member and the minor foam member, the gap in the major foam member extending to the outer skin.

\* \* \* \* \*